United States Patent
Caridis et al.

(10) Patent No.: US 11,324,240 B2
(45) Date of Patent: May 10, 2022

(54) PROCESS FOR QUICKLY CONVERTING RAW CORN KERNELS INTO A MASA AND FINISHED PRODUCTS

(71) Applicant: Heat and Control, Inc., Hayward, CA (US)

(72) Inventors: Andrew Anthony Caridis, San Carlos, CA (US); Arturo Lorenzana Guerrero, Zapopan (MX); Ernesto Isam Arao Toyohara, Zapopan (MX); Mario Lorenzana Saucedo, Tlaquepaque (MX); Sergio González Granados, Tlaquepaque (MX); Miguel Ángel Gómez Angulo, Zapopan (MX); Jesús Adolfo Sandoval Ávila, Coyoacán (MX)

(73) Assignee: Heat and Control, Inc., Hayward, CA (US)

( * ) Notice: Subject to any disclaimer, the term of this patent is extended or adjusted under 35 U.S.C. 154(b) by 0 days.

(21) Appl. No.: 15/538,962

(22) PCT Filed: Dec. 24, 2015

(86) PCT No.: PCT/US2015/000443
§ 371 (c)(1),
(2) Date: Jun. 22, 2017

(87) PCT Pub. No.: WO2016/105557
PCT Pub. Date: Jun. 30, 2016

(65) Prior Publication Data
US 2019/0124961 A1    May 2, 2019

Related U.S. Application Data

(60) Provisional application No. 62/124,605, filed on Dec. 26, 2014.

(51) Int. Cl.
*A23L 7/117* (2016.01)

(52) U.S. Cl.
CPC ........... *A23L 7/117* (2016.08); *A23V 2002/00* (2013.01)

(58) Field of Classification Search
USPC ........................................................ 426/549
See application file for complete search history.

(56) References Cited

U.S. PATENT DOCUMENTS

| | | | |
|---|---|---|---|
| 4,778,690 A * | 10/1988 | Sadel, Jr. | A23L 7/117 426/448 |
| 4,985,269 A | 1/1991 | Irvin et al. | |
| 5,100,686 A | 3/1992 | Hunt et al. | |
| 5,395,637 A | 3/1995 | Reec | |
| 5,558,886 A * | 9/1996 | Martinez-Bustos | A23P 30/20 264/211.21 |
| 6,025,011 A | 2/2000 | Wilkinson et al. | |

(Continued)

*Primary Examiner* — Lien T Tran
(74) *Attorney, Agent, or Firm* — Donald MacIntosh

(57) ABSTRACT

A system for converting whole kernel corn into mesa within a brief period of time. A system including apparatus for removing the pericarp and stem from the kernels and residuals being ground into a flour of suitable particle sizes. This flour is combined with lime and water and mixed for 6-12 minutes reaching a terminal temperature of about 50 degrees Celsius or and wherein gelatization occurs, forming a masa. Further apparatus then fragments the masa into sizes for further processing.

10 Claims, 12 Drawing Sheets

(56) References Cited

U.S. PATENT DOCUMENTS

| | | | |
|---|---|---|---|
| 6,171,629 B1 | 1/2001 | Morikawa | |
| 2003/0198725 A1* | 10/2003 | Cardenas | A21D 2/02 426/549 |
| 2004/0142079 A1* | 7/2004 | Brubacher | A21D 2/36 426/496 |
| 2007/0237882 A1* | 10/2007 | Koechner | A23B 9/02 426/622 |
| 2012/0263854 A1* | 10/2012 | Chedid | A21D 2/02 426/551 |

* cited by examiner

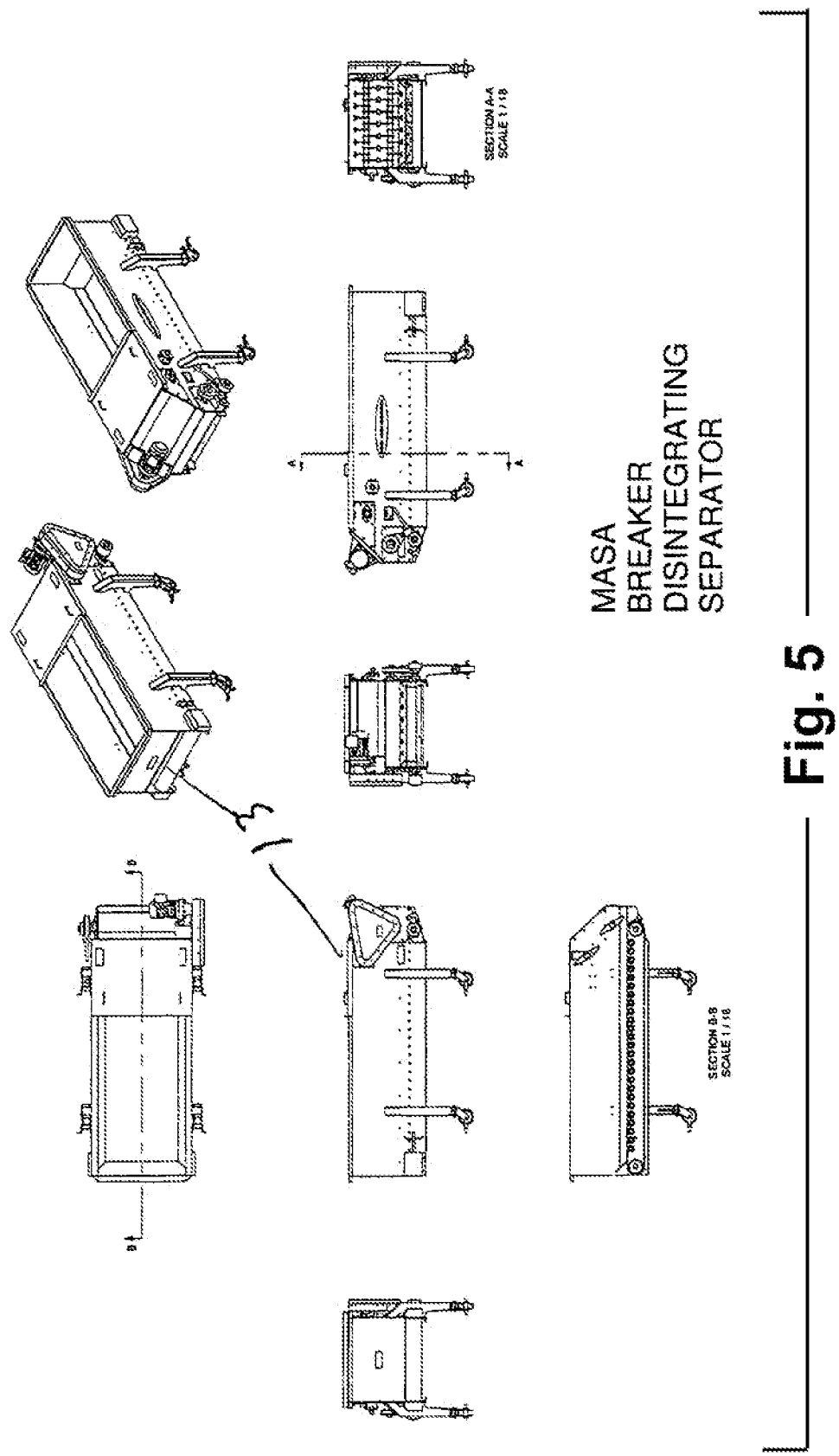

Fig. 6

GENERAL PROCESS AND MASA DATA OPERATION RANGES

| Product | PROCESS DATA RANGES | | | MASA DATA RANGES | |
|---|---|---|---|---|---|
| | Knifes # | Mixing Time Min, Sec | Speed RPM | Temperature °C | Entalphy Gelatinization J/g |
| Tortilla Chip | 90 | 8'00"-10'00" | 250 | 48-50 | 5-7 |
| Tostada | 90 | 10'00"-12'00" | 250 | 52-54 | 7-8 |
| Rolled Tortilla | 100 | 12'00"-15'00" | 250 | 54-56 | 8-9 |
| Corn Craker | 100 | 12'00"-15'00" | 250 | 54-57 | 8-9 |

| Product | Unit | GOOD PRODUCT | | | | BAD PRODUCT | |
|---|---|---|---|---|---|---|---|
| | | Rolled Tortilla | Tortilla Chip | Totopo | Tortilla Chip | Tortilla Chip | Tortilla Chip |
| Raw Corn Type | | Sinaloa | Sinaloa | Sinaloa | Tenamaxclan | Tenamaxclan | Tenamaxclan |
| Moisture % | % | 11.84 | 11.84 | 11.84 | 11.12 | 11.12 | 11.12 |
| Oil content % | % | 9.86 | 9.86 | 9.86 | 9.5 | 9.5 | 9.5 |
| Entalphy gelatinazation | J/g | 10.866 | 10.866 | 10.866 | 10.9 | 10.9 | 10.9 |
| M.M Process Data | | | | | | | |
| Knifes | | 100 | 90 | 100 | 90 | 90 | 90 |
| Flour kg | kg | 60 | 60 | 60 | 92 | 92 | 92 |
| Water added Lt | Lt | 34 | 34 | 34 | 58 | 58 | 58 |
| | % | 45 | 45 | 45 | 45 | 45 | 45 |
| Temperature Water added °C | °C | 52 | 52 | 52 | 52 | 52 | 52 |
| Lime added Kg | Kg | 0.36 | 0.36 | 0.36 | 0.552 | 0.552 | 0.552 |
| | % | 0.6 | 0.6 | 0.6 | 0.6 | 0.6 | 0.6 |
| Speed Mixing RPM | RPM | 250 | 250 | 250 | 250 | 250 | 250 |
| Mixing Time Min. | Min, sec | 8'50" | 9'30" | 13'30" | 15'30" | 15'30" | 14'30" |
| Masa Data | | | | | | | |
| Final Temperature °C | °C | 52 | 51 | 56 | 50 | 50 | 45 |
| Final Moisture % | % | 42.7 | 43.22 | 43.74 | 44.91 | 44.91 | 46.52 |

Table 1

Fig. 7

| Entalphy gelatinazation | | 8.821 | | 9.563 | 10.199 | 9.87 |
|---|---|---|---|---|---|---|
| Product Picture | | | | | | |

Table 2

Fig. 8

| HYBRID | HARDNESS RATING | Masa Maker process | % ETHEREAL ABSTRACT OIL | % PEDICEL | % PERICARP | % GERM | % STARCHY ENDOSPERM | % ENDOSPERM CRYSTALLINE |
|---|---|---|---|---|---|---|---|---|
| crystalline 2006QPM | very hard | To Test | 6.36 | 2.65 | 6.50 | 11.73 | 3.46 | 75.66 |
| semicrystalline 378 yellow | very hard | To Test | 5.60 | 1.77 | 7.33 | 11.29 | 13.15 | 66.45 |
| semicrystalline 377 | hard | Good | 5.02 | 4.85 | 5.67 | 8.31 | 9.42 | 71.75 |
| semicrystalline Vald8 | hard | Good | 4.86 | 3.56 | 9.34 | 10.87 | 18.20 | 58.03 |
| semicrystalline als666 | intermediate | Good | 5.10 | 1.61 | 6.60 | 14.76 | 9.03 | 68.00 |
| semidented Vald11 | hard | Good | 5.74 | 3.08 | 5.11 | 10.91 | 11.40 | 69.51 |
| semidented Vald3 | hard | Good | 5.54 | 2.10 | 6.49 | 10.26 | 18.79 | 62.36 |
| semidented als777 | intermediate | Good | 4.72 | 1.47 | 8.40 | 12.56 | 17.12 | 72.42 |
| Dented ValdCEX | intermediate | Good | 5.09 | 1.47 | 7.70 | 10.38 | 13.63 | 66.82 |
| Semi starchy Adr | soft | To Test | 4.80 | 2.67 | 5.44 | 11.70 | 20.65 | 59.54 |
| Ron starchy | soft | To Test | 4.54 | 3.67 | 5.11 | 9.78 | 19.60 | 61.84 |
| ELO starchy | soft | To Test | 5.73 | 2.50 | 3.13 | 12.29 | 43.12 | 38.97 |

Table 3 - Sheet 1

Fig. 8 . . . Cont.
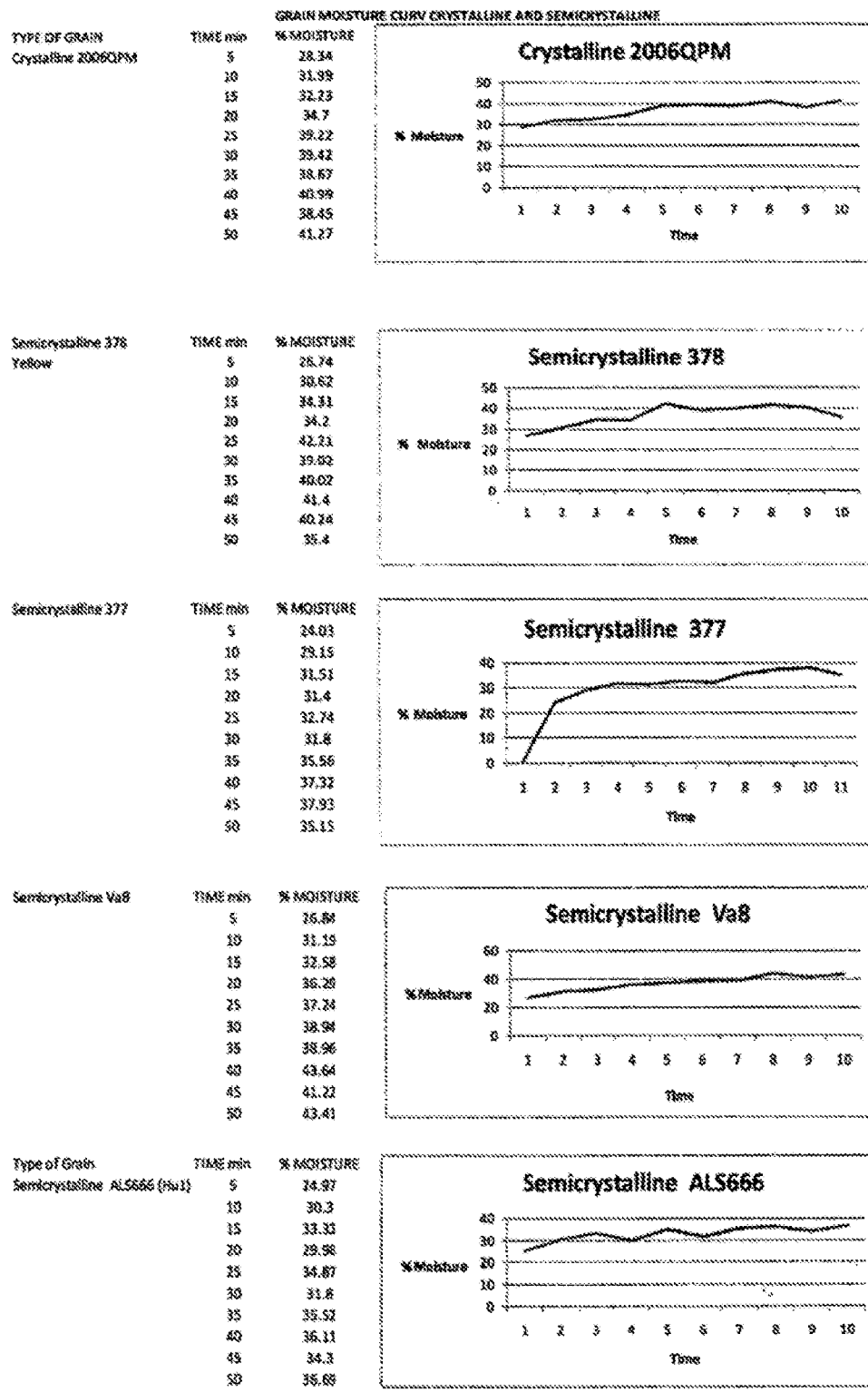
Table 3 - Sheet 2

Fig. 8 . . . Cont.
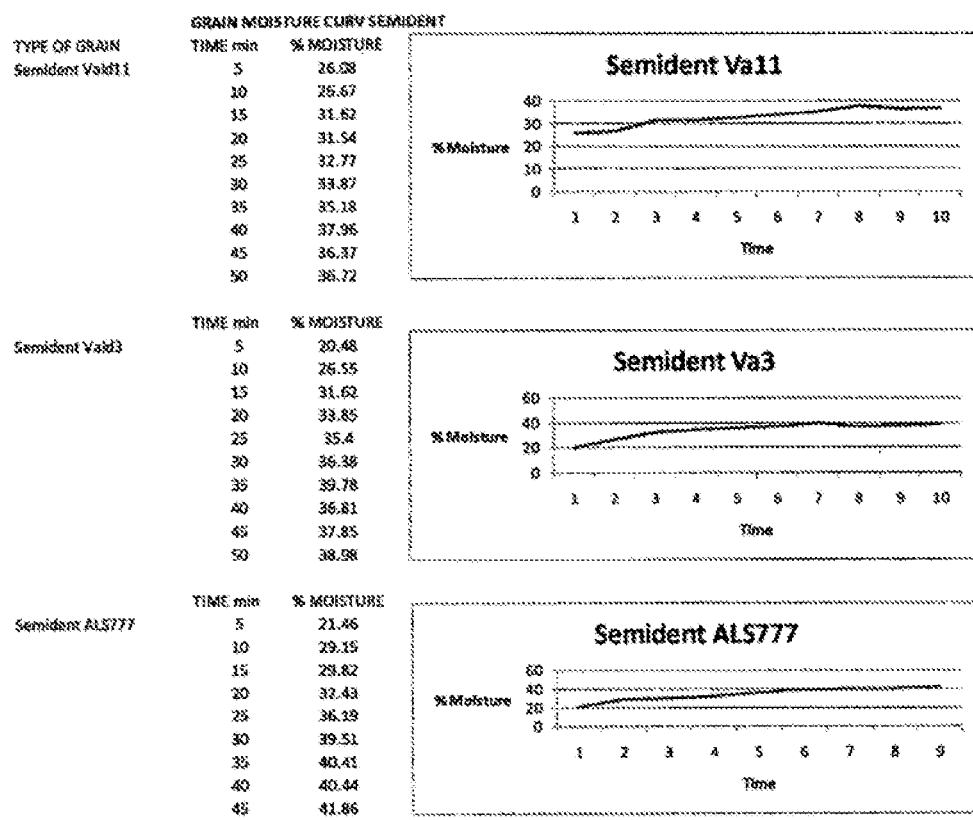
Table 3 - Sheet 3

Fig. 8 . . . Cont.
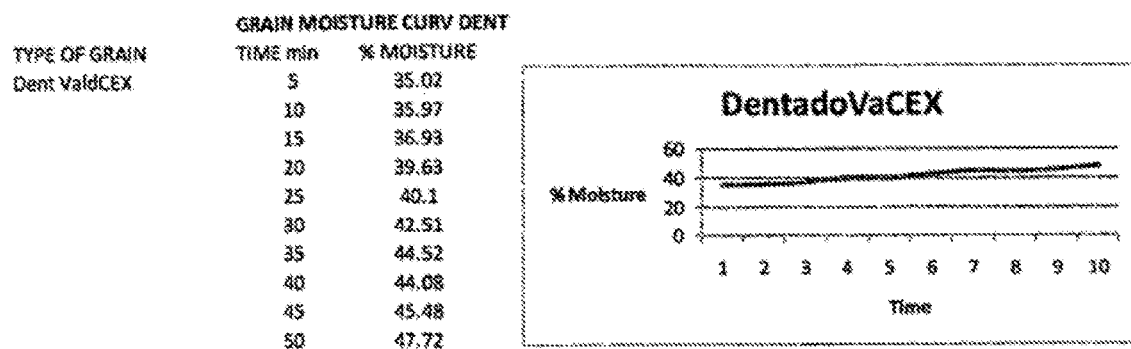
Table 3 - Sheet 4

Fig. 8 . . . Cont.
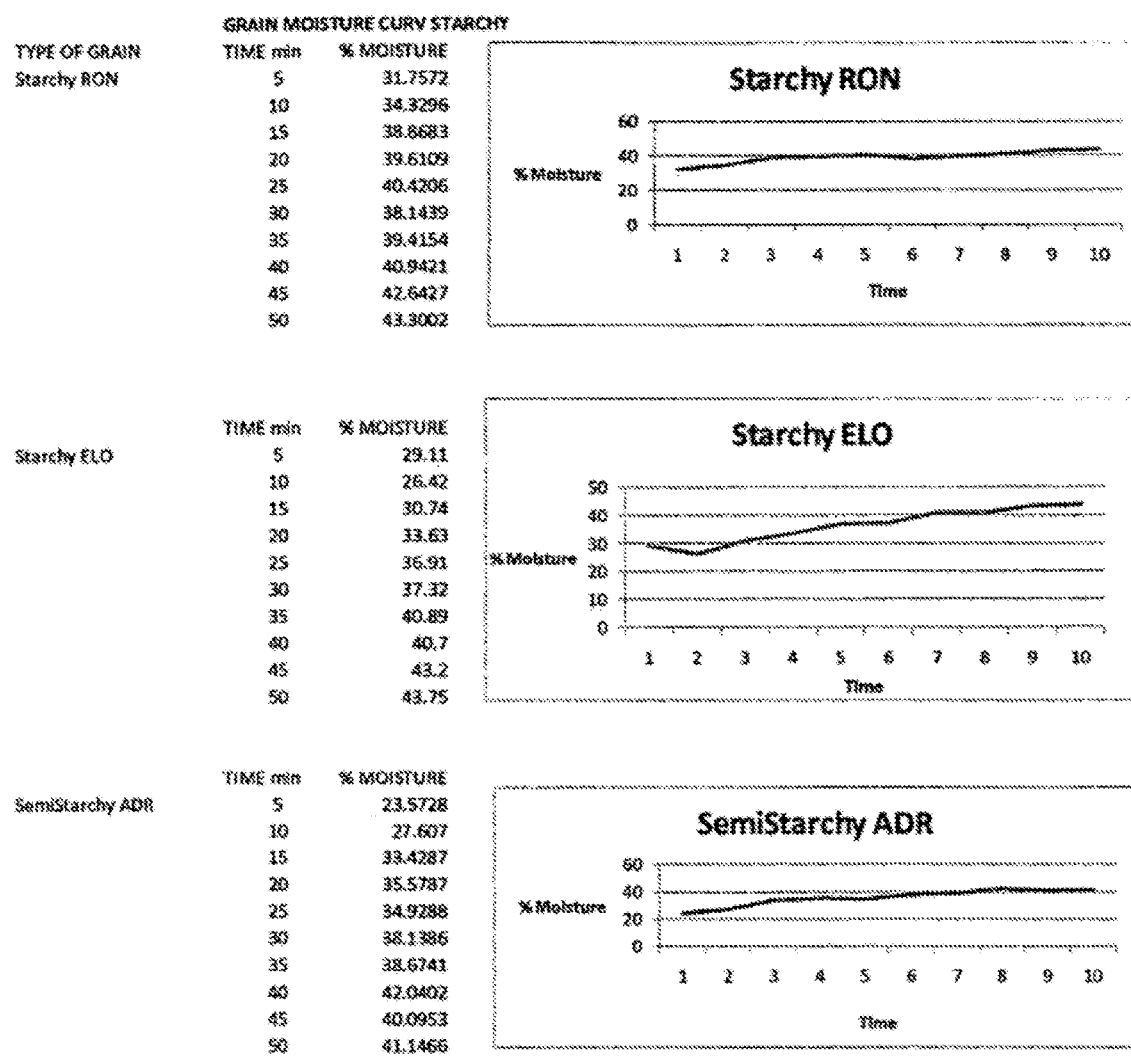
Table 3 - Sheet 5

PROCESS FOR QUICKLY CONVERTING RAW CORN KERNELS INTO A MASA AND FINISHED PRODUCTS

FIELD OF THE INVENTION

This invention concerns making corn based products from a starting material of raw, uncooked, whole corn kernels, manipulating those kernels into a masa, sheeting the masa and forming cooked products therefrom. Nixtamalization of the corn is occasioned without added external heat or cooking in the presence of lime. Finished products include tortilla, tortilla chips, corn chips, taco shells and snack products of various configurations.

BACKGROUND OF THE INVENTION

This invention derives from the ancient process of converting corn, maize, etc. into an edible and digestible food. It was known to the native living in Central America prior to the coming of the European explorers.

Nixtamalization is the Nahuatl word for the cooking and steeping of corn in alkaline water. The steeping liquor in an earlier era was simply dumped into the local sewer system but in our modern era this is unacceptable environmentally.

Known as nejayote, this liquid was drained off after the process was complete and the remaining corn was washed to remove a portion of its skin and the excess alkali. At this point the batch of corn is known as nixtama which can be ground to produce the dough known as masa—from which there was made tortillas, tamales, tlacoyos, etc; or it can be left whole and boiled again to produce the puffed up boiled corn used in posole.

Nixtamalization was invented in ancient Mesoamerica, now Mexico and Central America, over 3500 years ago. The alkalai of choice in this region is calcium hydroxide (slaked lime). Nixtamalization spread with corn culture to the American southwest, where nixtamal is known by the Native American word hominy, and potassium carbonate (potash) and lye are the common bases. Nixtamalization eased the workload of women charged with performing the back-breaking labor of grinding corn. Untreated corn is extremely difficult to grind by hand—especially using the traditional Mesoamerican metate e mano: a stone table and rolling pin.

The alkaline water of nixtamalization partially dissolves the corn's hard skin (the pericarp), allowing the grain to take up water much more quickly and grind much more easily. Besides this fundamental benefit, nixtamalization does much more.

Nixtamalized corn has an amazing aroma and flavor, which is why a tortilla doesn't taste like plain cornmeal.

Nixtamalized corn makes a fantastic masa—ideal for tortillas, tamales, tlacoyos, etc. Untreated corn doesn't—we'll see why later.

Mature corn, as opposed to green and sweet corn, is deficient in available niacin. It contains plenty of bound niacin (as glycosides associated with proteins) and alkali processing releases it. European explorers did not realize this crucial fact when they appropriated corn as a staple grain.

Because western milling technology was so advanced, they didn't see the need for nixtamalization. As a result, Pellagra, a horrific disease brought on by niacin deficiency, plagued and sometimes killed poorer Europeans and Euro-Americans who consumed primarily corn.

If calcium hydroxide is used as the alkali, the calcium content of the corn skyrockets. Nixtamalized corn is the primary source of calcium for many people who consume tortillas as a staple food.

"Nixtamalization" is the process of cooking maize grains in a lime solution, soaking and washing them, to obtain "nixtamal". This nixtamal is then stone-ground to obtain nixtamal dough or masa. A variety of products (e.g. tortilla and corn chips, tamales, tostadas, tacos, enchiladas, atoles, etc.) are obtained from masa and tortilla is the most popular one. Whole corn kernels are used in the manufacture of corn tortillas in which the masa flour used to make the tortillas is prepared by a traditional method called nixtamalization.

During the nixtamalization process, the calcium content of corn kernels increases notably depending on the time of soaking of the corn kernels.

Simultaneous processes of water and calcium diffusion occur during the nixtamalization process, affecting the final product's physicochemical characteristics.

The term nixtamalization refers to the alkaline cooking process of converting corn into foods such as tortillas and snack foods (corn chips, tortillas chips, and tacos).

This alkaline cooking technique softens the pericarp and allows the endosperm to absorb water, thus facilitating its milling. The nixtamal is washed several times to remove excess lime, the maize seed coat, and other solids. This material is then ground into dough (masa) from which tortillas and other food products are made. The nixtamal is also ground and dehydrated to obtain flour used to make tortillas (Sahai et al., 2001). However, traditional nixtamalization processes generate effluents on a large scale, require long soaking time (12-16 hr), and high liquid-waste discharges (3-10 L of contaminating effluents/kg of corn).

Traditional nixtamalization also carries an important energy cost due to the low efficiency of heat transfer. All these factors have important economic and commercial implications. Another disadvantage of this process is that requires various pieces of equipment for cooking and soaking (steeping) stages, which are expensive and require large room space in the tortilla/snacks producers' facilities.

Establishing the optimum conditions for an acceptable masa consistency is still considered an art based on experience and scientific insight. It is generally recognized that corn physical characteristics are important factors that influence the nixtamalization process.

It is not new the use of ground whole corn kernels to produce masa suitable to produce tortillas. Vaquiero (1986) developed a process (U.S. Pat. No. 4,594,260) by using whole corn kernels in a selective nixtamalization process which comprises separating the hull from the kernels for forming a hull fraction and an endosperm-germ fraction, subjecting only the hull fraction to nixtamalization such as by heating in an alkaline solution and then mixing the nixtamalized hull fraction with the untreated endosperm-germ fraction. This mixture is suitable for producing a good quality corn flour suitable for producing tortillas.

More recent efforts have examined the effects of fractionating the corn kernel prior to nixtamalization thereby decreasing the volume of effluent waste. See e.g. Martinez-Montes et al., 2001 (U.S. Pat. No. 6,265,013) and Sanchez y de la Camara, 2002 U.S. Pat. No. 6,358,550). However, these efforts have focused on nixtamalization of the pericarp fraction.

Years later Brubacher (2004) developed a process (U.S. Pat. No. 6,818,240) for the production of flour and dough using ground corn kernels where before grinding the hull and tip cap are removed from the corn kernels which ground corn produces an endosperm/germ flour. The endosperm/germ flour then is moisturized and cooked with direct and indirect heat to gelatinize about 10 to about 50 weight percent of the starch in the flour.

Eckhoff et al (2006) described a nixtamalization process (U.S. Pat. No. 7,740,895) that uses corn meal as base ingredient, reducing the amounts of water and lime necessary to form high quality masa; this process utilizes fractions of dry milling (corn grit, corn meal, and corn flour) instead of corn grain. Any of these fractions can be nixtamalized separately to form high quality masa for tortillas, chips, etc., or instant masa flour for consumer sales. Moreover, in all reviewed patents, involve cooking the mixture of grinded corn fractions, lime and water by applying heat, as a fundamental stage of their process to produce masa.

The Sabritas U.S. Pat. No. 7,220,443 issued May 22, 2007, and U.S. Pat. No. 8,110,239, issued Feb. 7, 2012, teach adding heat to the flour, water lime mixture to achieve gelatization to develop a masa dough. The equipment requirements and their use, such as extruders, results in a comparatively slow production process.

SUMMARY OF THE INVENTION AND OBJECTS

The present invention discloses a system for producing masa and other corn based products using as starting materials raw, whole kernel corn, the system being operative to convert the raw starting materials into the finished product within a short period of time on the order of 20 minutes. Functional components of the system are its controls including the corn weigher, kernel pre-milling treatment means serving to remove kernel pericarp and other kernel factions. Further kernel per-cutting means serve to sever the kernel into smaller pieces prior to milling thus enabling a faster milling operation to produces a flour of a preferred particle distribution. Another weighing means in the system serves to measure out proportionate quanta of flour, lime and water for deposit into mixer apparatus means operatively controlled as to rotational speeds, duration and temperature of the constituents being mixed to realize nixtamalization thus creating a masa dough. Means serving to transfer the masa dough into a dough fragmenter so as to reduce the dough mass into small pieces so as to facilitate sheeting or other treatments for producing the desired product.

A general object of the present invention is to produce a system operative on a large commercial scale to produce corn masa using raw corn kernels and not a specialize prepared corn flour as it starting product thus realizing economies in raw material usage and overall quickness in production.

Another object of this invention is to enable in a continuous system adjustments to achieve better taste profiles in the finished products.

A further object of the present invention is to enable a commercial producer of corn bases products to be self-sufficient in the realm of corn kernel starting materials.

Another object of this invention is to enable the production of a consistent masa irrespective of the quality of the starting corn kernel materials.

Still another object of the present invention is to achieve thorough gelatinization and nixtamalization in producing masa without the need of kernel soaking and cooking time.

Yet a further object of this invention is to enable masa production that is compatible with community environmental standards in so far as avoiding any effluent discharges into the community waste disposal system.

These and other objects will become apparent to those skilled in the field from a complete understanding of the invention in view of the following drawings and full description of the operative features disclosed herein.

BRIEF DESCRIPTION OF THE DRAWINGS

FIG. 5 is a group of 9 views, 2 in perspective of the masa dough preacher-disintegrator shown in FIG. 4.

FIG. 6 is a table of general process and masa data operating ranges for different corn products.

FIG. 7 is table containing a group of product pictures illustrating entalphy gelatinazation.

FIG. 8 is a group of tables and graphs illustrating the relationship between moisture content and time for different types of grain.

DESCRIPTION OF THE PREFERRED EMBODIMENTS

Figure 1:
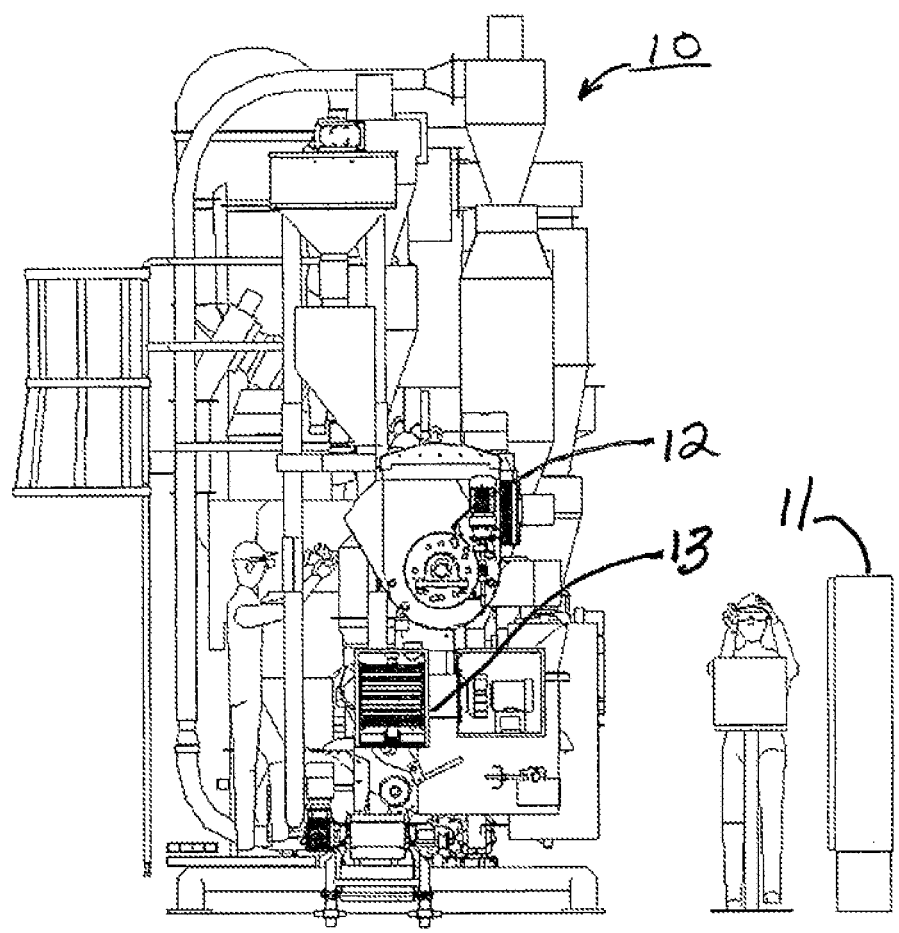
FIG. 1 is a elevation view of the discharge side of the masa maker system made in accordance with the principles of the present invention.
Figure 2:
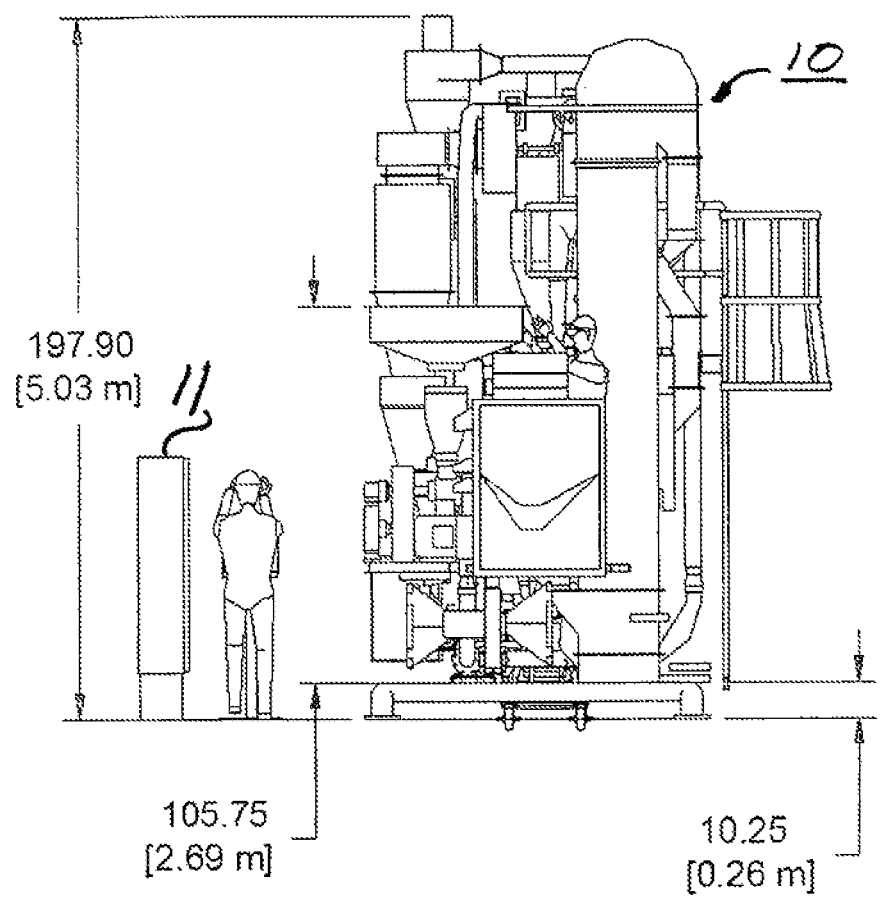
FIG. 2 is a view like FIG. 1 but showing the feed side of the masa maker system.

There is shown in the drawings, particularly FIGS. 1 and 2, a system 10 for making masa starting from raw corn kernels and related corn bases products, the system 10 being configured in accordance with the principles of the present invention. A control center station 11 is shown in the drawings embraces as soft ware and firm ware the several controls facilitating the steps for operating the system.

More specifically, because this system 10 is a unified set of component equipment its automatic controls serve to blend the functions of the individual components without the constant intervention of a human being. There follows a control plan that enables the system operation and overall function to produce masa from raw kernel corn.

Control 1: Selection of resultant end product from the group tortillas, tortilla chip, corn chip or taco and similar products.

Control 2: Selection of the corn type. See Tables 1-3 below from which a choice may be made and evaluate the corn's characteristics.

Control 3: Weigh the corn quantum loaded into the system.

Control 4: Treatment of the corn kernels, pre-milling, by soaking, abrading to remove pericarp, pre-cutting the kernels to enable removal of the additional pericarp, heart, stem or other corn factions.

Control 5: Evaluation of the amount of pericarp removal and the amount of residual corn factions.

Control 6: Mill/grind the residual corn faction into a flour with a desired particle distribution, i.e., control the particle size to the most desirable range.

Figure 3:
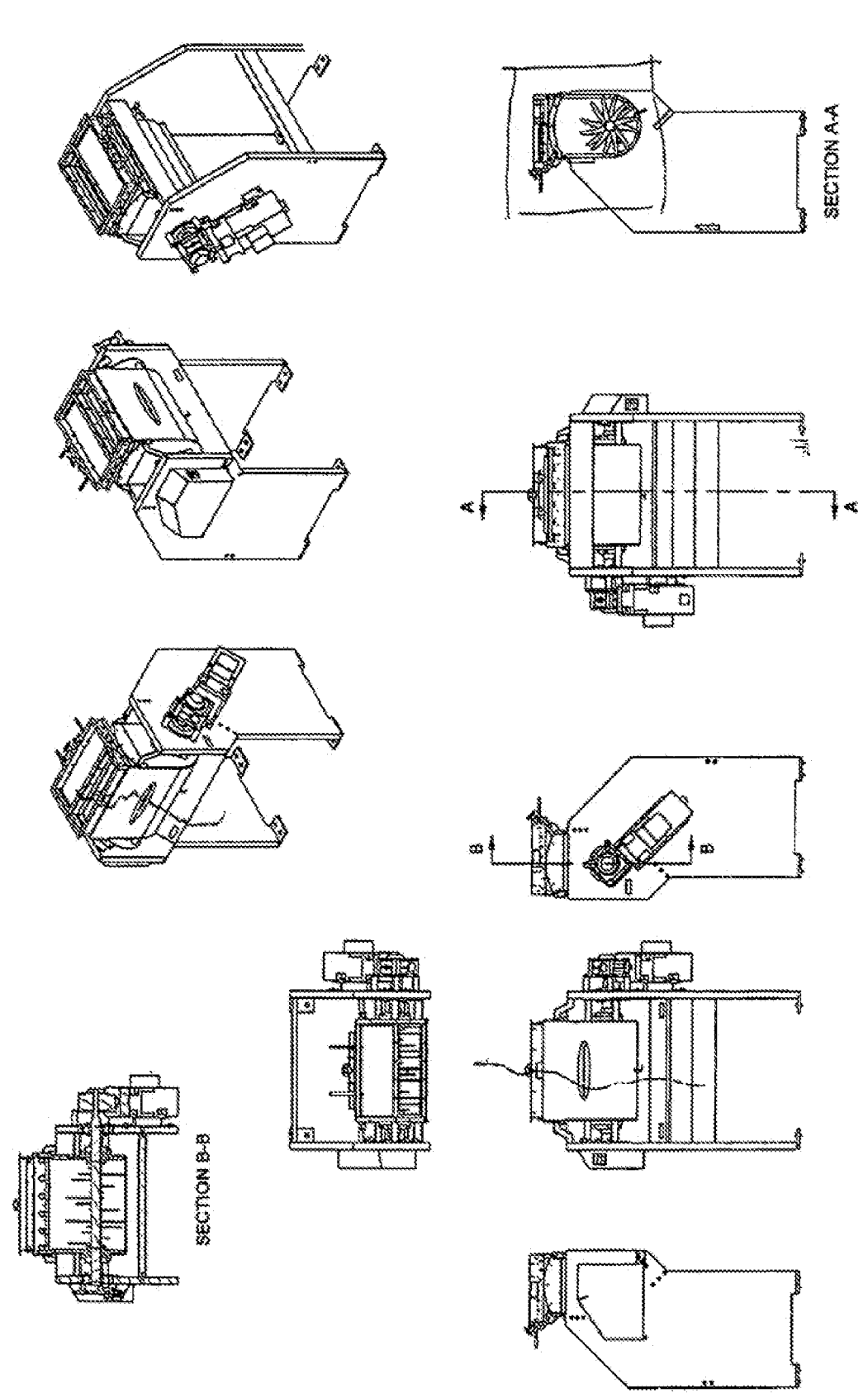
FIG. 3 is a group of 10 views illustrating a mixer apparatus especially adapted for use in the system of the present invention.

Control 7: Load a multi tine mixer 12, as shown in FIG. 3, with a selected quantum of flour and lime in a proper ratio.

Control 8: Supply water to the dry ingredients in the mixer 12 in a selected volume of water at a preferred water temperature.

Control 9: Mix for a selected period of time the dry ingredients of flour, lime with water until a preselected temperature of the mixture is attained and nixtamalization occurs developing a body of masa dough formed with a desired degree of gelatization and moisture content.

Figure 4:
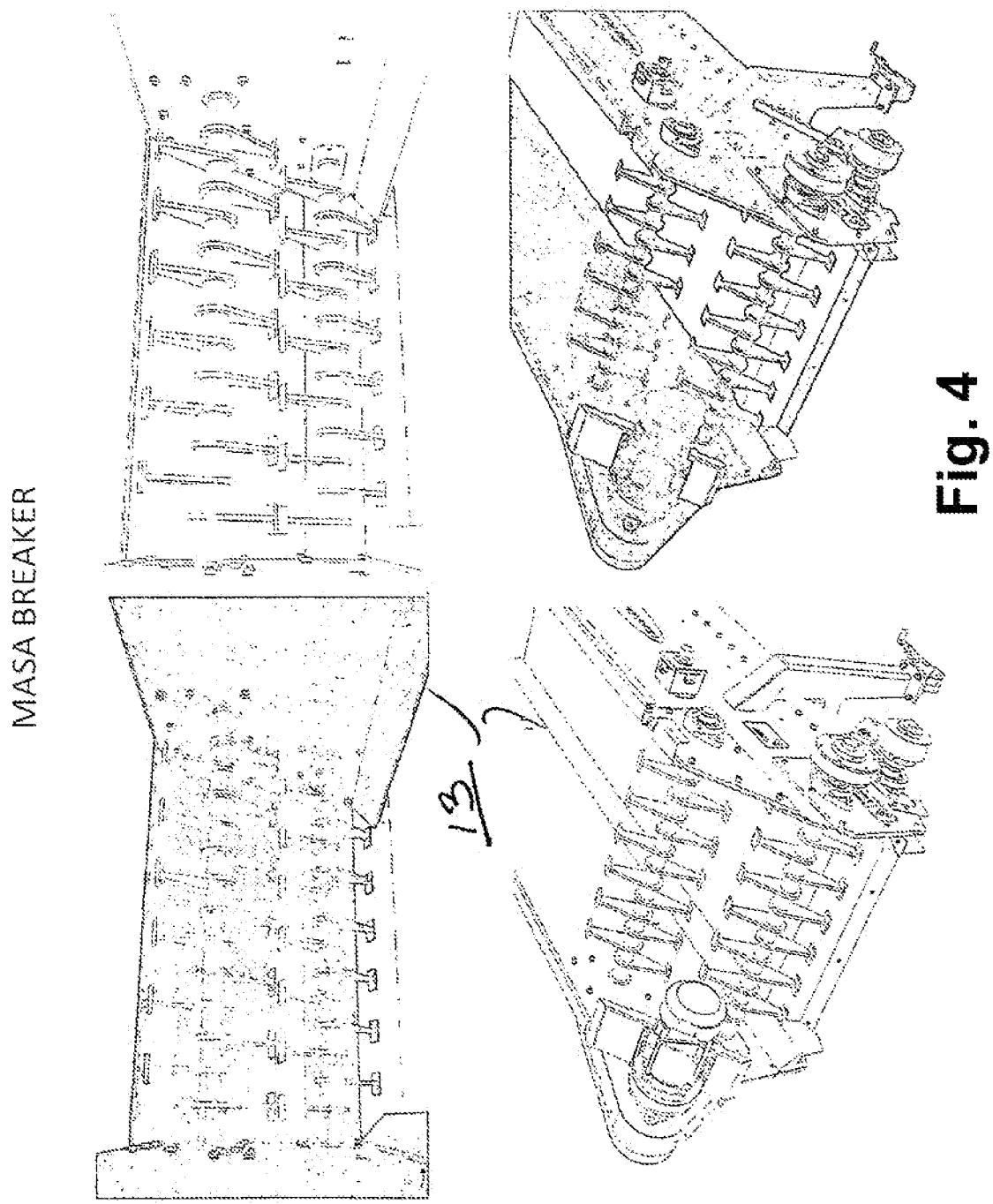
FIG. 4 is a group of 4 perspective views illustrating the masa dough breaker or disintegrator especially adapted for use in that system of the present invention.

Control 10: After removing the body of masa dough from the mixer 12 transfer the dough into a masa disintegrator 13, FIGS. 4 and 5, to reduce its size into portions in a size range comparison to that of a soccer ball to that of a baseball, thereby permitting the masa to cool and nixtamalization to cease.

Control 11: Sheeting the masa portions into the preselected thickness and shaped pieces.

Control 12: Cooking the shaped pieces in either an oven, an oil bath or the like to attain the selected end product.

Control 13: Test the end product for taste, crunch and appearance via a taste panel and, if needed, make the necessary adjustment in the above Controls to achieve a perfect product.

The thirteen Controls listed above could be added to, expanded upon or deleted from as matter dictate and are determined. However all of the Controls will connect to a Master/Prime Control, with a touch screen. The Master Control will be programed to enable quick changes from product to product, from corn type to corn type.

Suitable apparatus to effect degerminization of the corn kernels thus enabling removal of pericarp and germ is available from the Brazilian company, Industraias Machina Zaccaria S/A, 13484-016 Limeira/SP-Brasil.

Suitable apparatus to achieve pre-cutting the corn kernels is available from Urschek Laboratories Incorporated of Valpariso, Ind., 48384. Comitrol processor models 1700 and 3600 are suitable to perform this function.

The invention claimed is:

1. A process for converting uncooked, whole kernel corn into a masa, comprising:
    weighing a batch of kernels for treatment and conversion into masa;
    moisturizing the surfaces of the kernels;
    removing portions of the pericarp and germ components of the kernels;
    slicing the kernels into pre-milling particles;
    grinding the particles into flour with particle sizes under about 50 microns;
    the nixtamalization steps of:
        weighing a quantum of flour and a quantum of lime and depositing the same into an open top shear force chamber;
        adding water to the flour and lime in the shear force chamber; and
        applying shear forces to the flour, lime and water to mix the same and increase a temperature of the mixture to a range of 50 to about 55 degrees Celsius within a time period of from 4 to about 11 minutes wherein gelatinization occurs and develops a dough of masa;
    the nixtamalization steps being free of external heating and instead relying solely on the application of shear forces to generate heat;
    further comprising subjecting the masa dough to fragmentation forces thus developing individual masa pieces in a range of sizes approximating that of an apple to that of a melon so as to facilitate sheeting or other treatments for producing a desired product;
    wherein the entire process occurs in a short period of time on the order of 20 minutes and can operate on a large commercial scale for making tortillas, tortilla chips, tostadas and other comestible corn products.

2. The process of claim 1 wherein the kernels are sliced into pre-milling particles with a rotary cutter having from 75 to 95 cutting elements.

3. The process of claim 1 wherein the shear forces are applied to the mixture in a cavity by a rotatable, multi-tined shaft driven at a speed in a range of 150 to 250 rpm.

4. The process of claim 1 wherein the fragmentation forces are applied to the dough by a blade equipped, driven rotatable shaft assembly.

5. A process for converting uncooked, whole kernel corn into a masa for comestible corn products, comprising the steps of:
    moisturizing the surfaces of a batch of corn kernels;
    removing pericarp and germ components from the kernels;
    slicing the kernels into pre-milling particles;
    grinding the particles into a flour with particle sizes smaller than about 50 microns;
    the nixtamalization steps of:
        introducing the flour and proportionate amounts of lime and water into an open top shear force mixing chamber; and
        applying shear forces to the flour, lime and water in the chamber to mix the same and increase a temperature of the mixture to a range of 50 to about 55 degrees Celsius in a time period of about 4 to 11 minutes during which gelatinization occurs and a dough of masa is formed;
    wherein the nixtamalization steps are free of external heating and instead relying solely on the application of shear forces to generate heat;
    and wherein the entire process occurs in a short period of time on the order of 20 minutes and can operate on a large commercial scale.

6. The process of claim 5 wherein the kernels are sliced into pre-milling particles with a rotary cutter having from 75 to 95 cutting elements.

7. The process of claim 5 wherein the shear forces are applied to the mixture in a cavity by a rotatable, multi-tined shaft driven at a speed in the range of 150 to 250 rpm.

8. The process of claim 5 further comprising the step of applying fragmentation forces to the masa dough to separate the dough into individual masa pieces of desired size.

9. The process of claim 8 further comprising the step of rolling the masa pieces into sheet form for further processing into a comestible corn based product.

10. The process of claim 8 wherein the fragmentation forces are applied to the dough by a blade equipped, driven rotatable shaft assembly.

* * * * *